Patented Feb. 1, 1938

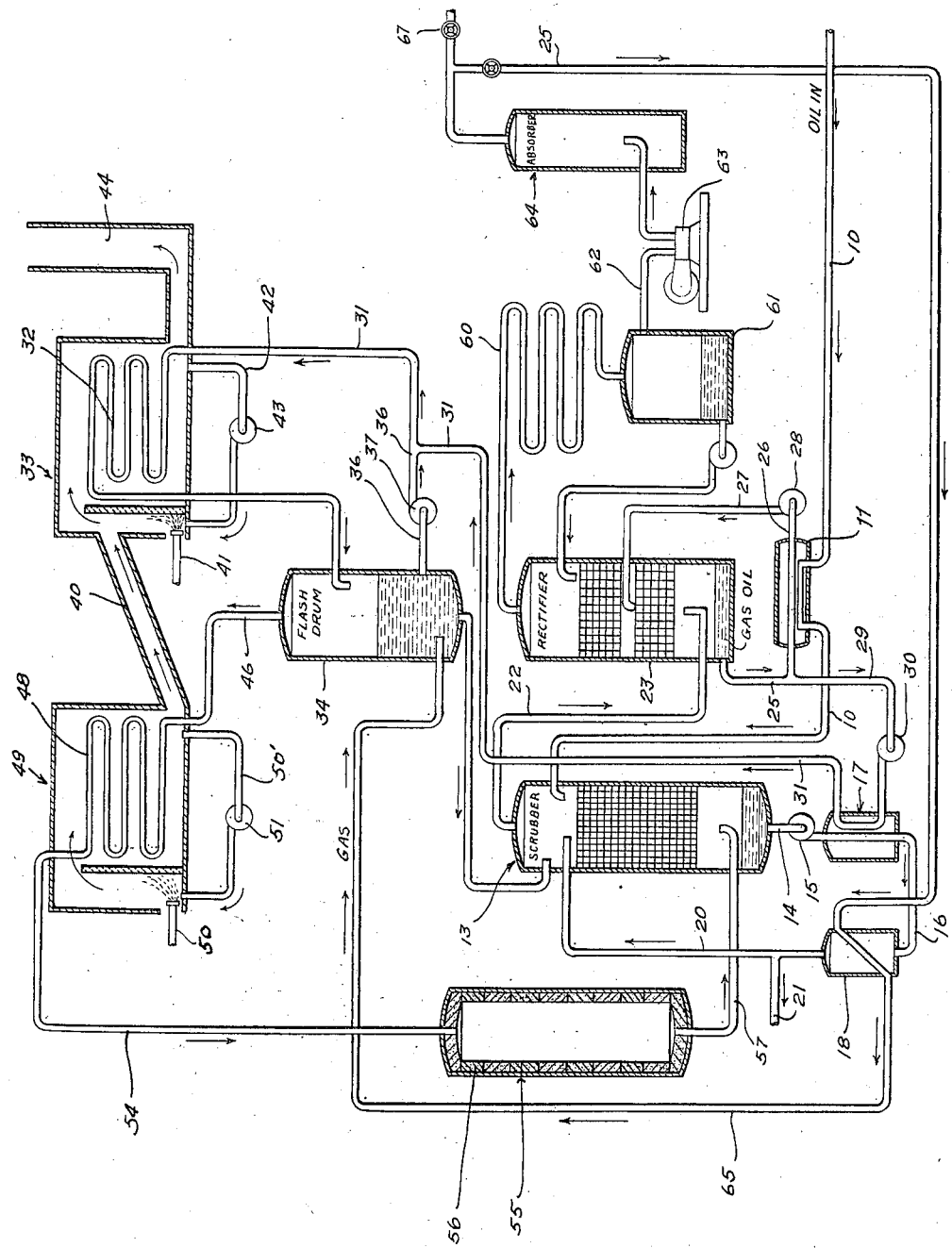

2,107,235

UNITED STATES PATENT OFFICE 2,107,235

PROCESS OF CONVERTING HYDROCARBONS IN THE VAPOR PHASE

Myron W. Colony, Los Angeles, Calif., assignor to Petroleum Conversion Corporation, New York, N. Y., a corporation of Delaware Application August 26, 1933, Serial No. 686,898

8 Claims. (Cl. 196—61)

My present invention relates to improvements in processes of converting or cracking hydrocarbon oils into compounds suitable as motor fuels. It more particularly relates to such processes which are conducted in the vapor phase.

It has previously been proposed to effect cracking of oil in the vapor phase by passing the vapors through heated tubes at a comparatively high velocity so that although the vapor will have been heated to the cracking temperature comparatively little cracking will take place in the tubes, the heated vapors being then conducted to a heat insulated chamber wherein the cracking reaction will be completed to the desired extent. Such a process has the advantage that the heating tubes are maintained comparatively free from carbon resulting from the cracking reaction. It is open, however, to certain disadvantages arising chiefly from the fact that the cracking reaction is not self-sustaining. This reaction absorbs heat thereby giving rise to a substantial drop in temperature during the progress of the reaction even though loss of heat from radiation and conduction is kept at a minimum. Since the velocity of the cracking reaction halves for every 22° F. drop in temperature, the average cracking temperature for the process above outlined may be brought down to an undesirably low value. If the temperature of the oil vapors at the start of the cracking be raised in the attempt to supply the necessary heat, then the risk of overheating and overcracking portions of the vapors is very considerably increased so that the practical limit of the initial heating is quickly reached.

In my present invention I overcome the above mentioned drawbacks by mingling with the oil vapors prior to heating a substantially inert gas in such proportion, as for example, on the order of ½ pound of gas per pound of oil vapor, as will increase the mass of the mixture substantially and thus increase the number of heat units to be consumed by each unit of oil vapor in dropping in temperature a given amount; as a result of this the mixture of oil vapor and inert gas drops in temperature less in amount and less rapidly than would the oil vapor alone. Preferably, the gas mingled with the oil vapor is that produced in the system itself, or some fraction of that gas, as, for instance, the lean gas from the stripping of such gas produced in the system. Such gas, since it has already been heated or formed at the highest temperature in the system, is substantially inert during the recycle. An advantage of using the gas formed in the system is that it has a high specific heat due to its substantial hydrogen content. Thus, as an example of the effect of the use of the gas we may consider that the specific heat in calories per gram per degree C. (or B. t. u. per pound per degree F.) of the oil vapor to be .8 and that of the recycled gas to be 1.2. If, say, one-half pound of gas be added per pound of vapor, the amount of heat released per degree drop in temperature for the 1½ pounds of mixture would be 1.4, i. e., $$\frac{1.2}{2} \cdot 8$$

whereas the vapor alone on cooling would release only .8 calories. In other words, by the addition of this amount of gas of this type, a gain in available heat units is had in the ratio of 1.75 to 1. This means that if the oil vapor alone would drop 17.5° in undergoing a given percentage of conversion the mixture would drop only 10° in undergoing the same percentage of conversion of the oil vapor. Thus the mixture would remain more nearly at constant temperature than the oil vapor alone for the same reaction time, which is obviously advantageous.

By the use of the gas in this manner the further important result is achieved that the initial cracking temperature may be kept comparatively low. However, it will be obvious that if for any reason it is desired to use the higher conversion temperatures usual in the art, certain advantages of my invention will still be availed of such as the reduction of local overheating of the vapor in the heater and the flattening out of the temperature-time curve representing the cracking conditions. Thus, it is possible according to my invention to operate as high as 1150° F. although I prefer to operate at temperatures initially ranging from 950 to 1050° F. At the temperature of around 1,000° F., which is especially preferred, the reaction time for 30% conversion will range from two to four minutes.

The amount of gas returned for best results is susceptible to variation. The greater the amount returned the greater is the so-called inertia or flywheel effect, but on the other hand the more gas returned the greater amount of fuel is necessary to heat it and the greater is the difficulty of stripping from the gas the gasoline vapors. Ordinarily, the amount of gas returned should not be less than ¼ by weight of the oil vapor treated nor more than twice such weight, with preference given to the amount of gas approximately ½ the weight of the oil vapors when cracking at temperatures up to 1,000° F. When employing cracking temperatures higher than this, particularly in excess of 1050° F., a greater proportion of gas should be used.

In returning a desired proportion of the gas to the system I preferably introduce at least a substantial portion of it into the oil undergoing evaporation prior to the cracking step whereby the evaporation is facilitated. If desired, all or a portion of the gas may be heated although I do not, so far as this invention is concerned, contemplate using gas heated to a temperature at which cracking of the oil vapors will be brought about. Further beneficial effects of the use of the gas are a forced circulation tending to sweep the reaction products toward the final condenser and a reduction in the corrosive effect of the oil vapor due to the dilution of the corrosive components by inert gas. Also, by thus diluting the oil vapors, the danger from local overheating of the vapors in the heater is much reduced.

Still further objects of the invention and advantages thereof will be apparent from the following detailed description taken with the annexed drawing which shows diagrammatically a plant containing a preferred embodiment.

Referring now to the drawing, oil is admitted to the system through pipe 10; it then passes through preferably a heat exchanger 11, and then into a scrubber 13 in which it is caused intimately to contact with the freshly converted vapors from the reaction zone to be described and thereby to remove entrained carbon and a portion of the sensible heat therein. It will be understood that a sufficient pool of oil will be maintained within the scrubber to make for the desired uniformity of temperature conditions as well as for the evaporation of desired fractions of the entering oil; to accomplish this, means are provided for circulating a body of oil through the scrubber consisting of a draw-off 14, pump 15, pipe 16 in communication with heat exchanger 17, heat exchanger 18, pipe 20, the purpose of the heat exchangers being to regulate the heat in the oil circulating through the scrubber. Preferably also, a portion of the oil circulated is continuously withdrawn as residue through a pipe 21 branching from pipe 20.

The conditions maintained in scrubber 13 are preferably such as to cause the vaporization of the fractions of the oil which are desired for conversion, and such vapor passes out through pipe 22 to the bottom of a rectifier 23. The purpose of this apparatus is to separate out the fractions which are to be converted from those already subjected to this action, and which are suitable as motor fuels. Accordingly, as in the case of scrubber 13, means are provided for circulating oil therethrough consisting of pipe 25, pipe 26 communicating with heat exchanger 11 above referred to, pipe 27 and pump 28.

The oil condensed out in this rectifier 23, which in the usual situation will be of the gravity of gas oil, is continuously taken off from this chamber through pipe 29 (forming a continuation of pipe 25) through which it is passed by means of a pump 30 through heat exchanger 17 above mentioned and thence through pipe 31 to an evaporating coil 32, from which it is brought to a flash drum 34. The circulation of the oil from this drum back through coil 32 is had by means of a pipe 36 having therein pump 37 and communicating with pipe 31 leading to said coil. Evaporating coil 32 is heated preferably by combustion gases fed thereto through a conduit 40, as well as by an auxiliary burner 41. For regulating the temperature of such furnace, bypass 42 having a pump 43 for the flue gases is provided whereby the latter may be recirculated over the heating coil. The flue gases pass from the evaporator through a stack 44.

Oil vapor is taken off the drum 34 through a pipe 46 communicating with conversion coil 48 in furnace 49, the latter being heated by means of a burner 50. To carry the partially spent gases from furnace 49, a conduit 49 is provided leading into furnace 33 as above indicated. As in the case of said furnace last mentioned, bypass 50' having a pump 51 is provided for regulating and controlling the temperature around the tubes 48 by admixing the flue gases with those in the combustion chamber.

As above stated, the vapors are passed with sufficient rapidity through the conversion coil 48 as to raise their temperature to within the desired cracking range, say between 900° and 1050° F. or above without allowing time for substantially any cracking to take place within the coil, such heated vapors passing through a pipe 54 to a conversion chamber 55 preferably provided with heat insulation 56 as shown. In this chamber sufficient time is allowed the vapors to crack or to become converted, e. g., two to four minutes, whereupon the mixture of the converted products including some fixed gas is led therefrom through a pipe 57 into scrubber 13, whose action has been described. After leaving the reaction chamber the temperature of the vapors will be reduced, either in the scrubber or before the scrubber is reached, to a point where cracking ceases.

As stated above, the mixture of products from the conversion chamber, deprived of their suspended carbon, and of a portion of their heat in scrubber 13, is led therefrom through a pipe 22, thence into rectifier 23 and thence to a condenser 60, communicating with which is an accumulator tank 61. The fixed gas formed in the system together with light vapors remaining uncondensed is then led off by aid of pump 63 from accumulator 61 through the pipe 62 and admitted to an absorber 64 of known type wherein the condensible vapors are further separated.

A valve 67 is provided for bleeding off the excess gas of the system, the remainder being returned thereto through the pipe 25. After bringing the gas up to a suitable temperature in heat exchanger 18, it is introduced through pipe 65 preferably into the lower portion of the flash drum 34 where it assists in the evaporation of the oil by lowering the partial pressures of the vaporizing components thereof. Furthermore, the presence of the gas in the reaction products facilitates the vaporization of the oil contacted therewith in the scrubber 13. Moreover, the dilution occasioned by the oil vapors is found to aid in the prevention of corrosion, and furthermore, promotes the circulation of the reaction products to the condensing end of the system. It also facilitates control of the operating pressure of the system which, as will be seen, is not autogenous. Because of the conditions of conversion the gas after being stripped is constituted largely by hydrogen and methane and smaller amounts of other light hydrocarbons, to denote which and similar mixtures I have used in the claims the expression hydrogen containing gas.

This application is a continuation in part of my previous application Serial No. 449,231, filed May 2, 1930.

I claim:

1. The process of converting hydrocarbon oils into motor fuels of the gasoline type which consists in subjecting to vaporizing conditions in a vaporizing zone the oil to be converted, adding to the vapor produced a substantially inert gas having a temperature insufficient to produce cracking of the vapor and in an amount sufficient to increase the mass of the mixture substantially, then passing the mixture through a heating zone formed of exteriorly heated surfaces to heat it within the conversion range above 900° F. but passing the mixture through said zone so rapidly that no substantial cracking takes place therein and no substantial amount of carbon is deposited in said zone, then passing said mixture to a heat conserving chamber, wherein time is allowed for the heated vapors to undergo conversion by reason of the sensible heat imparted in said heating zone to the vapor and gas in admixture therewith and without the addition of any substantial quantity of heat while in said chamber, and separating out from the reaction products those desired as motor fuels.

2. The process of converting hydrocarbon oils into motor fuels of the gasoline type which consists in subjecting to vaporizing conditions in a vaporizing zone the oil to be converted, adding to the vapor produced a substantially inert gas having a temperature insufficient to produce cracking of the vapor and in an amount sufficient to increase the mass of the mixture substantially, then passing the mixture through a heating zone to heat it within the conversion range of 950 to 1150° F. but passing the mixture through said zone so rapidly that no substantial cracking takes place therein and no substantial amount of carbon is deposited in said zone, then passing said mixture to a heat conserving chamber, wherein time is allowed for the heated vapors to undergo conversion by reason of the heat imparted in said heating zone to the vapor and gas in admixture therewith and without the addition of any substantial quantity of heat while in said chamber, and separating out from the reaction products those desired as motor fuels.

3. The process of converting hydrocarbon oils into motor fuels of the gasoline type which consists in subjecting to vaporizing conditions in a vaporizing zone the oil to be converted, adding to the vapor produced a substantially inert gas having a temperature insufficient to produce cracking of the vapor and in an amount equal to at least one fourth by weight of the vapor, then passing the mixture through a heating zone to heat said mixture to within the conversion range above 900° F. but passing the mixture through said zone so rapidly that no substantial cracking takes place therein and no substantial amount of carbon is deposited in said zone, then passing said mixture to a heat conserving chamber and there maintaining said mixture for such a period as will enable the cracking reaction to go to the desired completion by virtue of the sensible heat which was imparted to said mixture in said heating zone and without the addition of any substantial quantity of heat while in said chamber.

4. The process of converting hydrocarbon oils into motor fuels of the gasoline type which consists in subjecting to vaporizing conditions in a vaporizing zone the oil to be converted, adding to the vapor produced a substantially inert hydrogen containing gas of relatively high specific heat, said gas having a temperature insufficient to produce cracking of the vapor and in an amount sufficient to increase the mass of the mixture substantially, then passing the mixture through a heating zone formed of exteriorly heated surfaces to heat it within the conversion range above 900° F. but passing the mixture through said zone so rapidly that no substantial cracking takes place therein and no substantial amount of carbon is deposited in said zone, then passing said mixture to a heat conserving chamber, wherein time is allowed for the heated vapors to undergo conversion by reason of the sensible heat imparted in said heating zone to the vapor and gas in admixture therewith, and without the addition of any substantial quantity of heat while in said chamber, and separating out from the reaction products those desired as motor fuels.

5. The method according to claim 3 in which the gas is added to the oil undergoing vaporization in the vaporizing zone whereby to facilitate the vaporization of the oil.

6. The process according to claim 3 in which the gas is constituted by the gas formed in the system which is thereupon returned and admixed with the vapor to be converted.

7. The method according to claim 1 in which the gas is added to the oil undergoing vaporization in the vaporizing zone whereby to facilitate the vaporization of the oil.

8. The method according to claim 1 in which the gas is constituted by the gas formed in the system, which is thereupon returned and admixed with the vapor to be converted.

MYRON W. COLONY.

Certificate of Correction

Patent No. 2,107,235.  February 1, 1938.

MYRON W. COLONY

It is hereby certified that error appears in the printed specification of the above numbered patent requiring correction as follows: Page 1, second column, line 10, for "$\frac{1.2}{2}.8$" read $\frac{1.2}{2}+.8$; and that the said Letters Patent should be read with this correction therein that the same may conform to the record of the case in the Patent Office.

Signed and sealed this 15th day of March, A. D. 1938.

[SEAL]  HENRY VAN ARSDALE,
*Acting Commissioner of Patents.*